United States Patent
Fukaya et al.

(10) Patent No.: US 7,705,738 B2
(45) Date of Patent: Apr. 27, 2010

(54) DATABASE APPARATUS, ATTENTION CALLING APPARATUS AND DRIVING SUPPORT APPARATUS

(75) Inventors: Naoki Fukaya, Obu (JP); Kentarou Hitomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 12/079,134

(22) Filed: Mar. 25, 2008

(65) Prior Publication Data

US 2008/0236929 A1 Oct. 2, 2008

(30) Foreign Application Priority Data

Mar. 30, 2007 (JP) ............... 2007-092451

(51) Int. Cl.
  *G08B 23/00* (2006.01)
(52) U.S. Cl. ............ 340/576; 340/575; 340/573.1
(58) Field of Classification Search .......... 340/573.1, 340/576, 575

See application file for complete search history.

(56) References Cited

U.S. PATENT DOCUMENTS

| | | | | |
|---|---|---|---|---|
| 5,465,079 A * | 11/1995 | Bouchard et al. | ........... | 340/576 |
| 5,786,765 A * | 7/1998 | Kumakura et al. | .......... | 340/576 |
| 5,813,993 A * | 9/1998 | Kaplan et al. | ............. | 600/544 |
| 6,049,747 A * | 4/2000 | Nakajima et al. | ........... | 340/576 |
| 6,974,414 B2 * | 12/2005 | Victor | ........................ | 340/576 |
| 7,027,621 B1 * | 4/2006 | Prokoski | .................... | 340/576 |
| 7,403,124 B2 * | 7/2008 | Arakawa et al. | ............. | 340/576 |
| 7,561,054 B2 * | 7/2009 | Raz et al. | .................... | 340/576 |
| 7,565,230 B2 * | 7/2009 | Gardner et al. | .............. | 340/439 |
| 7,642,922 B2 * | 1/2010 | Itou | ............................ | 340/576 |
| 2002/0120374 A1 * | 8/2002 | Douros et al. | ............... | 340/439 |
| 2005/0030184 A1 * | 2/2005 | Victor | ........................ | 340/576 |

FOREIGN PATENT DOCUMENTS

| | | |
|---|---|---|
| JP | 2002-367100 | 12/2002 |
| JP | 2003-327009 | 11/2003 |
| JP | 2004-157880 | 6/2004 |
| JP | 2006-244343 | 9/2006 |
| JP | 2006-318049 | 11/2006 |
| JP | 2006-343904 | 12/2006 |
| JP | 2007-073011 | 3/2007 |

* cited by examiner

*Primary Examiner*—Eric M Blount
(74) *Attorney, Agent, or Firm*—Harness, Dickey & Pierce, PLC (57) ABSTRACT

An attention calling apparatus operates in the following manner. That is, eyes distribution pattern is generated from the behavior of the eyes of the vehicle driver captured by a camera in a predetermined time, and driver's condition is estimated based on the distribution pattern. Further, concentration of the driver on driving is estimated based on the comparison between the distribution pattern and the stored information of distribution pattern. When the distribution pattern indicates that the degree of concentration on driving is high, the driving operation is stored in storage in association with the concentration degree. When the operation situation fulfills a notification provision condition, driver's attention is called depending on the concentration degree.

20 Claims, 8 Drawing Sheets

COEF : 0.71

COEF : 0.077

DATABASE APPARATUS, ATTENTION CALLING APPARATUS AND DRIVING SUPPORT APPARATUS

CROSS REFERENCE TO RELATED APPLICATION

The present application is based on and claims the benefit of priority of Japanese Patent Application No. 2007-92451 filed on Mar. 30, 2007, the disclosure of which is incorporated herein by reference.

FIELD OF THE INVENTION

The present disclosure generally relates to a driving support apparatus for use in a vehicle.

BACKGROUND INFORMATION

Conventionally, the control situation of an instructor of the driving training school (in Japan) in an appointed road was stored as a standard driving model, and, based on a comparison between stored driving model and current control situation, an attention calling notification for a vehicle driver is provided by, for example, an attention calling apparatus disclosed in Japanese patent document JP-A-2004-157880.

However, when the above apparatus was in operation, a vehicle driver in a concentrated condition on driving who was intentionally decreasing the inter-vehicle distance on a congested road was distracted by the notification of attention calling from the apparatus whenever the driving operation by the driver is out of the standard driving model regardless of the regardless of the mind and body condition of the vehicle driver or of the traffic situation. In other words, the attention calling was provided either at an awkward timing such as too frequent attention calling in an unnecessary situation to be only serving as an annoyance, or a lack of attention calling at an attention required situation.

SUMMARY OF THE INVENTION

In view of the above and other problems, the present disclosure provides a technique of attention calling at an appropriately suited to the driver's preference without compromising driving safety.

The database apparatus of the present invention includes, a condition estimation unit capable of estimating a driver condition of a driver who is driving a vehicle; an operation acquisition unit capable of acquiring an operation sequence of the vehicle by the driver; a storage unit capable of storing the driver condition estimated by the condition estimation unit and the operation sequence acquired by the operation acquisition unit; a concentration estimation unit capable of estimating a degree of concentration of the driver on driving operation by comparing the driver condition estimated by the condition estimation unit or the operation sequence acquired by the operation acquisition unit with the driver condition or the operation sequence stored in the storage unit; and a control unit capable of performing a control for sequentially storing, to the storage unit for accumulation, the driver condition in association with the operation sequence when the degree of concentration estimated by the concentration estimation unit is determined, by the control unit, to have a value that is higher than a threshold.

In the above database apparatus, only the information of the driving operation sequence of the vehicle by the driver who is concentrated on the driving operation is stored in the storage unit, based on the estimation of the concentration degree of the driver by a comparison with stored information, thereby enabling a reduction of data storage with an improved estimation accuracy. In other words, the information represents a preferable driving model to be serving as a standard.

BRIEF DESCRIPTION OF THE DRAWINGS

Other objects, features and advantages of the present invention will become more apparent from the following detailed description made with reference to the accompanying drawings, in which.

DETAILED DESCRIPTION

The embodiment which the present invention was applied to as follows is explained with the drawing. The present invention needs not be limited to the form of the embodiment of the present invention at all, and can take various forms as far as it pertains to the technical range of the present invention.

First Embodiment

Configuration of the Attention Calling Apparatus 1

Figure 1:
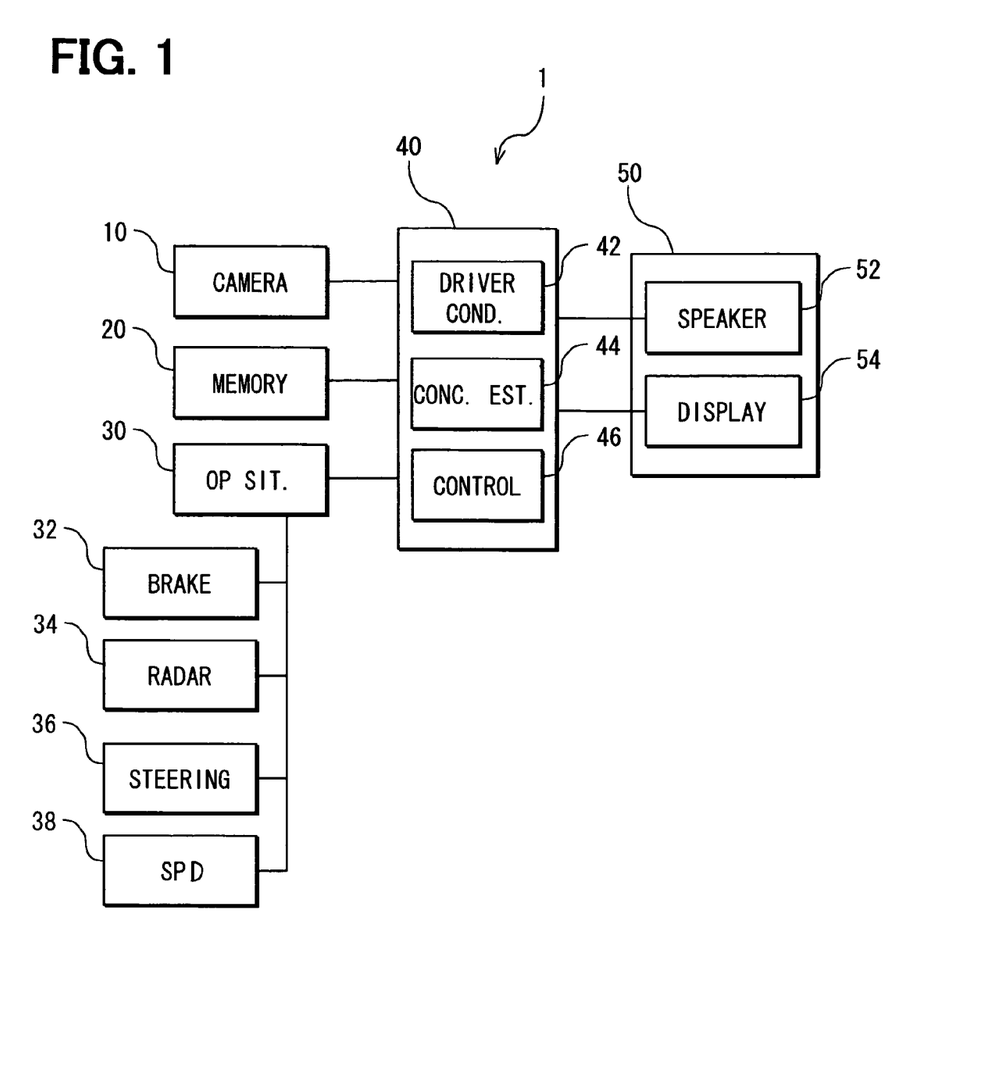
FIG. 1 shows a block diagram showing outline configuration of attention calling apparatus 1 in an embodiment of the present invention.

FIG. 1 is a block diagram showing outline configuration of an attention calling apparatus 1.

The attention calling apparatus 1 has a camera 10, a memory 20, an operation situation acquisition unit 30, a control unit 40 and a notification unit 50 as shown in FIG. 1.

The camera 10 is the CCD camera which is installed in a dashboard of the vehicle to be able to acquire the face image of the vehicle driver for a purpose of acquiring the behavior of the eyes (gaze behavior) of the vehicle driver in order to estimate the state of the mind and body of the vehicle driver who is driving the vehicle.

The memory 20 is a HDD, a memory stick or the like to store the state of the mind and body of a vehicle driver acquired with the camera 10 and estimated with a vehicle driver condition estimation unit 42 of the control unit 40 and to store the control situation of a vehicle acquired with the operation situation acquisition unit 30.

The operation situation acquisition unit 30 acquires the control situation of the vehicle by the vehicle driver, and operation of brakes 32, speed and distance of the leading vehicle from a radar 34, a steering angle of a steering wheel 36 and speed of the vehicle from a speedometer are acquired by the acquisition unit 30.

The control unit 40 has the vehicle driver condition estimation unit 42, a concentration estimation unit 44 and a controller 46. The behavior of the eyes of the vehicle driver is acquired from the face image of the vehicle driver acquired with the camera 10, and eyes distribution pattern is generated from the behavior of the eyes of the vehicle driver who is driving a vehicle in a predetermined time by the vehicle driver condition estimation unit 42. Further, the vehicle driver condition estimation unit 42 estimates the state of the mind and body of the vehicle driver from the generated eyes distribution pattern.

The concentration estimation unit 44 estimates the concentration degree to the driving of the vehicle driver who is driving a vehicle based on comparison between at least one of the state of the mind and body of the vehicle driver estimated with vehicle driver condition estimation unit 42 or the control situation of the vehicle acquired with the operation situation acquisition unit 30 and the state of the mind and body of a vehicle driver stored in the memory 20.

More practically, the eyes distribution pattern of the vehicle driver estimated by the estimation unit 42 in the predetermined period is compared with the eyes distribution pattern of the vehicle driver stored in the memory 20 to estimate the concentration of the driver to the driving.

The controller 46 determines the concentration degree to the driving of the vehicle driver estimated by the concentration estimation unit 44 whether it is higher than an appointed value, and when the concentration is determined to be higher than the appointed value, the state of the mind and body of a vehicle driver estimated with vehicle driver condition estimation unit 42 is associated with the control situation that has been acquired with the operation situation acquisition unit 30 to be stored and accumulated sequentially to the memory 20.

In addition, the controller 46 determines whether the control situation of a vehicle acquired with the operation situation acquisition unit 30 fulfills a predetermined condition to perform notification, and when the control situation is determined to be fulfilling the predetermined condition, notification for calling an attention of the vehicle driver is provided through the notification unit 50 according to the concentration degree of the driver to the driving estimated by the estimation unit 44.

The notification unit 50 is to calling an attention of a vehicle driver, and calls the attention by sound from a speaker 52 and an indication from a display unit 54. The sound output from the speaker 52 may be a voice, or may be a warning sound such as beeps or the like.

(Attention Calling Processing)

Attention calling processing carried out with the control unit 40 is explained based on FIGS. 2 to 9C.

Figure 2:
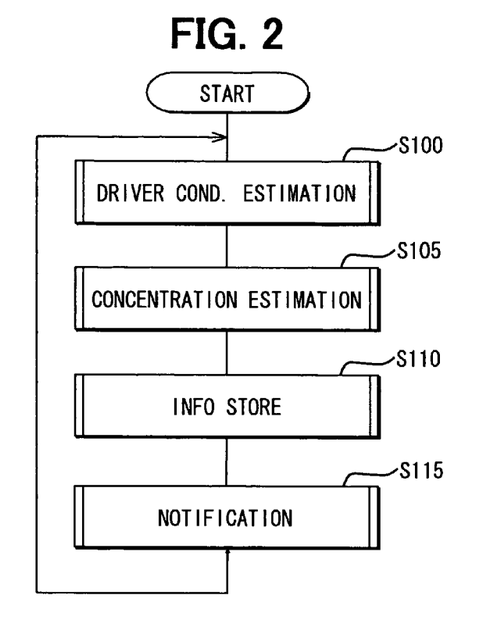
FIG. 2 shows a flow chart of attention calling processing.

FIG. 2 is a flow chart of the attention calling processing, and FIGS. 3 to 6 are flow charts of the subroutines of the attention calling processing.

The attention calling processing starts when power supply for the attention calling apparatus 1 is turned on, and as shown in FIG. 2, the vehicle driver condition estimation processing to estimate the state of the mind and body of the vehicle driver who is driving a vehicle in S100 is performed. Then, concentration degree estimation processing to estimate the concentration degree to the driving of the vehicle driver is performed in S105 subsequently.

Then, information storage processing to the memory 20 is performed in S110, and notification processing to perform attention calling to the vehicle driver is performed in S115 to return the processing to S100. The iteration of the attention calling processing is performed in this manner.

In addition, the attention calling processing is finished when the power supply for the attention calling apparatus 1 is turned off.

(Vehicle Driver Condition Estimation Processing)

Figure 3:
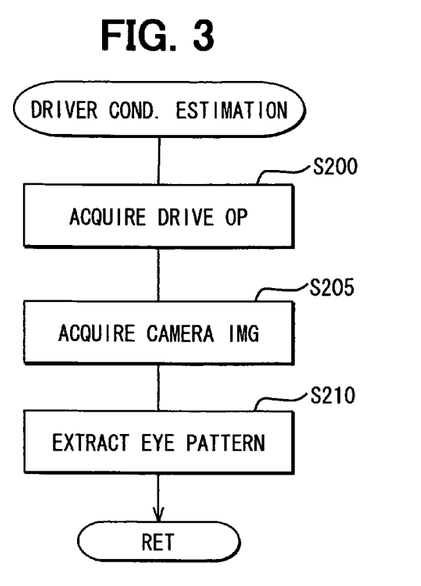
FIG. 3 shows a flow chart of vehicle driver state estimation processing.

Vehicle driver condition estimation processing is explained based on FIG. 3 next. FIG. 3 is a flow chart of the vehicle driver condition estimation processing that is a subroutine of the attention calling processing.

The vehicle driver condition estimation processing acquires from the operation situation acquisition unit 30 in S200, as shown in FIG. 3, whether the brakes 32 have been operated or the distance to the leading vehicle if the brakes 32 have been operated. Thus, the brake operation of the brakes 32 and/or operation timing of the brakes 32 are acquired in this manner.

In S205, the face image of the vehicle driver is acquired from the camera 10 for a predetermined time, and, subsequently in S210, the eyes of the vehicle driver are extracted from the face image of the vehicle driver acquired in S205 by image processing. Then, the behavior of eyes is extracted from the eyes of the vehicle driver extracted during a predetermined time, and the eyes pattern of the vehicle driver is generated based on the behavior of eyes.

Figure 7A:
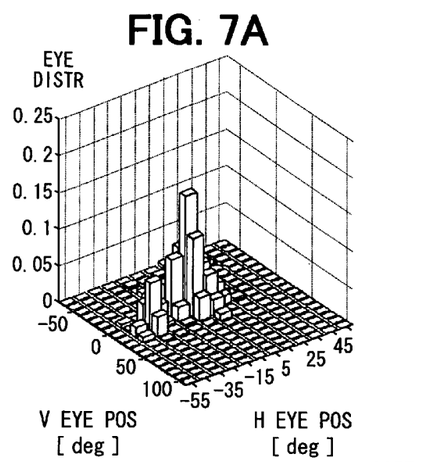
FIGS. 7A to 7C shows illustrations of an eyes distribution pattern and related information when a driver is concentrated on driving.
Figure 7B:
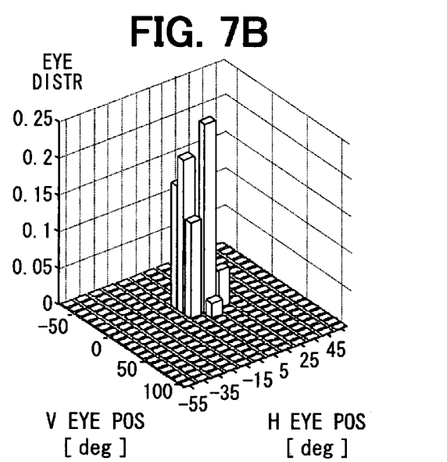

The example of the eyes pattern of a vehicle driver is shown in the FIGS. 7A, 7B. FIG. 7A shows the eyes distribution pattern when the driver is concentrated on the driving, and FIG. 7B shows a current eyes distribution pattern. In FIGS. 7A and 7B, horizontal two axes show the diversion angle (degree) of the eyes from a front direction (the front direction is 0 degree), and a vertical axis shows a frequency of the eyes diversion by using a bar graph.

(Concentration Degree Estimation Processing)

Figure 4:
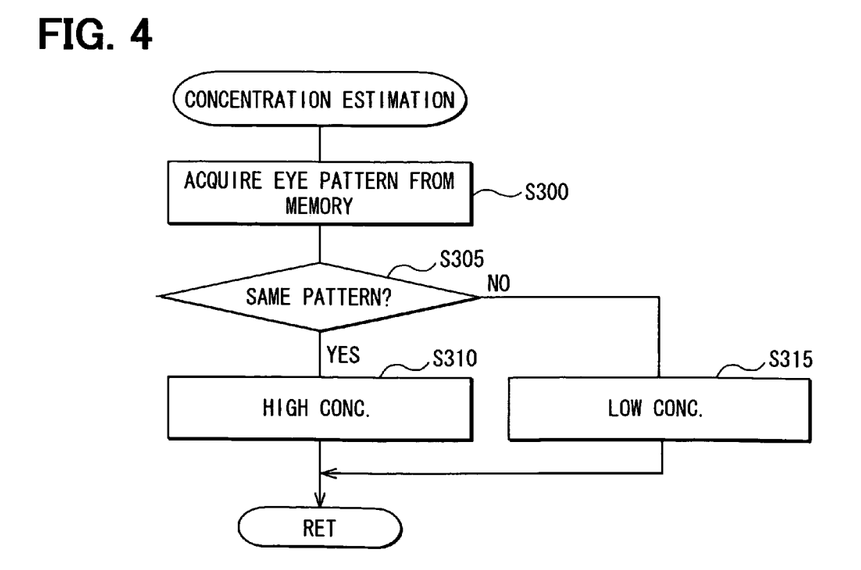
FIG. 4 shows a flow chart of concentration degree estimation processing.

Concentration degree estimation processing is explained based on FIG. 4 next. FIG. 4 is a flow chart of the concentration degree estimation processing that is a subroutine of the attention calling processing.

In the concentration degree estimation processing, the eyes distribution pattern of the vehicle driver at the time of concentration on the driving accumulated to the memory 20 is acquired in S300 as shown in FIG. 4. Subsequently in S305, the eyes distribution pattern of the vehicle driver at the time of concentration on the driving acquired in S300 is compared with the eyes pattern of the vehicle driver generated in S210 (cf. FIG. 3). When both patterns agree with each other (S305: Yes), the processing is finished based on a reason that the concentration degree for the driving of the vehicle driver is currently "high" in S310. When both patterns do not agree (S305:No), the processing is finished in S315 based on a reason that the concentration degree of the driver on the driver is currently "low."

The "high" concentration degree for the driving of the vehicle driver is shown in FIGS. 7A, 7B. The eyes distribution pattern of the high concentration degree of the vehicle driver is shown in FIG. 7A, and the current eyes distribution pattern is shown in FIG. 7B.

When the vehicle driver concentrates on the driving, as shown in FIG. 7A, the eye distribution is typically in a range between +20 and −30 [deg] in the horizontal direction and in a range of ±30[deg] in the vertical direction. In contrast, the current eyes distribution is in a range between +20 and −10 [deg] in the horizontal direction and in a range between +30 and −10 [deg] in the vertical direction. Therefore, a coefficient of correlation of the eye distribution in both directions is calculated as 0.71, thus the current eyes distribution pattern can be concluded as well agreeing with the standard eyes distribution pattern.

When the current eyes distribution pattern accords with the standard eyes distribution pattern in this way, it is determined that the concentration degree for the driving of the vehicle driver is "high."

Figure 8A:
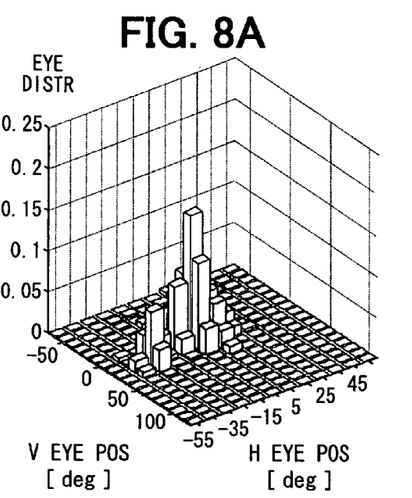
FIGS. 8A to 8C shows illustrations of an eyes distribution pattern and related information when a driver's attention is rambling.
Figure 8B:
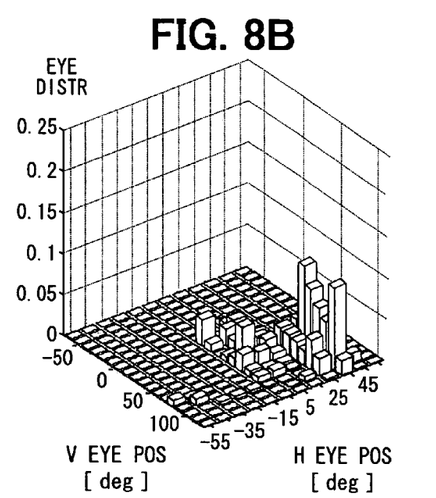

When the vehicle driver drives the vehicle without aim or excursively, the eye distribution is in a wide range between +50 and −10 [deg] in the horizontal direction and in a wide range between +110 and 0 [deg] in the vertical direction as shown in FIG. 8B. Thus, the coefficient of correlation of the current eyes distribution is calculated as 0.077 relative to the standard eyes distribution pattern (as shown in FIG. 8A), and both patterns are concluded as not agreeing.

When the current eyes distribution pattern does not accord with the standard eyes distribution pattern, it is determined that the concentration degree for the driving of the vehicle driver is "low."

(Information Storage Processing)

Figure 5:
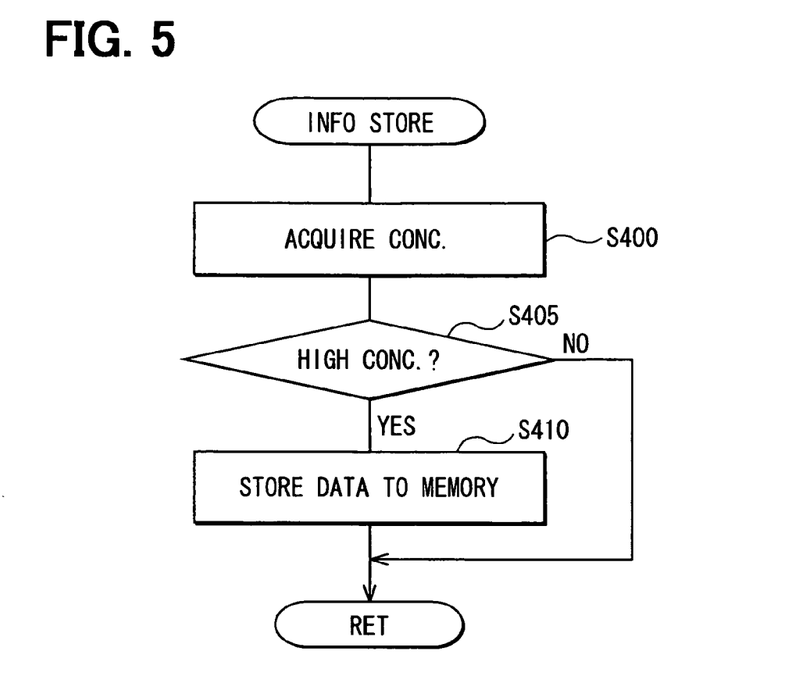
FIG. 5 shows a flow chart of information storage processing.

Information storage processing is explained based on FIG. 5 next. FIG. 5 is a flow chart of the information storage processing that is a subroutine of the attention calling processing.

In the information storage processing as shown in FIG. 5, the concentration degree for the driving of a current vehicle driver is acquired in S400 by the concentration degree estimation processing (cf. FIG. 4), and subsequently in S405, it is determined whether the concentration degree of the vehicle driver acquired in S400 is "high."

When it is determined that the concentration degree of the vehicle driver is "high" (S405:Yes), the eyes distribution pattern generated in S210 (cf. FIG. 3) is accumulated to the memory 20 in S410, and the processing is finished. On the other hand, the processing is finished without storing the pattern to the memory 20 when the concentration degree of the vehicle driver is not "high" (i.e., the concentration degree is "low.").

(Notification Processing)

Figure 6:
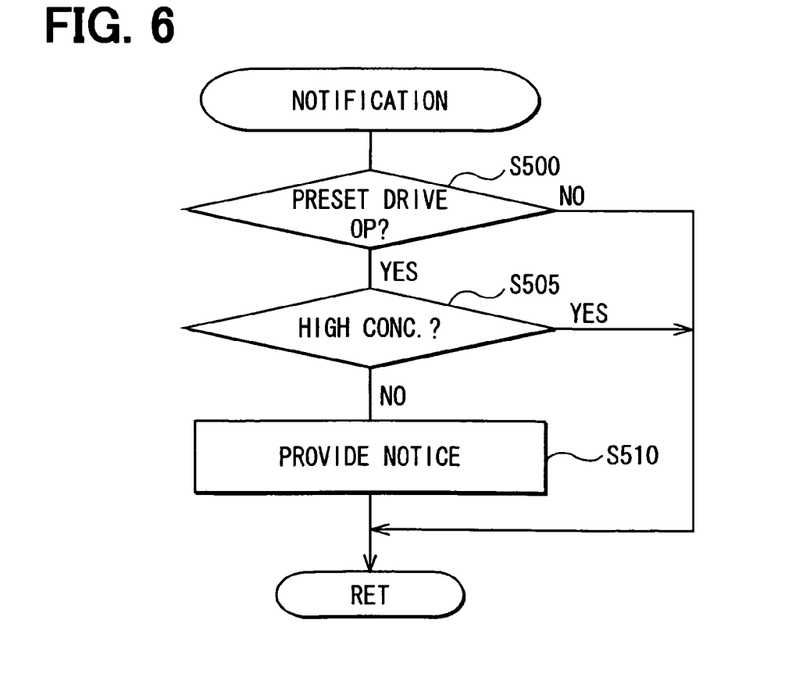
FIG. 6 shows a flow chart of notification processing.

Notification processing is explained based on FIG. 6 next. FIG. 6 is a flow chart of the notification processing that is a subroutine of the attention calling processing.

In the notification processing, as shown in FIG. 6, whether the control situation (e.g., drive operation) acquired in S200 (cf. FIG. 3) of the driver condition estimation processing in S500 is a predetermined condition is determined. When the control situation is not determined to be in a predetermined condition (S500:No), the processing is finished as it is. When the control situation is determined to be in a predetermined condition (S500:Yes), the processing proceeds to S550.

In S505, the concentration degree for the driving of the current vehicle driver provided in concentration degree estimation processing (cf. FIG. 4) is acquired, and whether the concentration degree of the vehicle driver is "high" is determined. Then, the processing is just finished as it is when it is determined that the concentration degree of the vehicle driver is "high" (S505:Yes), and notification for attention calling for the vehicle driver is performed with the notification unit 50 in S510 when the concentration degree is not "high" (i.e., the concentration degree is low), and the processing is finished.

(Advantageous Effects of the Attention Calling Apparatus 1)

According to the attention calling apparatus 1 explained above, the control situation (e.g., driving operation) or the state of the mind and body of the vehicle driver is compared with the relevant information accumulated in the memory 20, and the concentration degree to the driving of the vehicle driver is estimated. Then, information about the state of the mind and body of the vehicle driver associated with the control situation is stored and accumulated in the memory 20 sequentially if the estimated concentration degree is higher than the predetermined value.

In other words, only the data regarding the driving with the concentration degree higher than the predetermined value is accumulated, and the degree of concentration is determined based on the accumulated data. Therefore, the amount of information accumulated in the memory 20 is reduced, with the precision of the estimation increased in the course of accumulation.

In addition, the behavior of the eyes of the vehicle driver is acquired from the face image of the vehicle driver acquired with the camera 10, and the state of the mind and body of the vehicle driver is estimated from the behavioral information of acquired eyes. Therefore, the concentration degree for the driving of the vehicle driver can be estimated precisely based on the state of the mind and body of the vehicle driver being precisely estimated by the behavioral information of eyes.

The eyes distribution pattern generated from the behavior of the eyes of a vehicle driver who is driving a vehicle in a predetermined time is generated, and the state of the mind and body of the vehicle driver driving the vehicle is estimated from the generated eyes distribution pattern. Then, the concentration degree for the driving of the vehicle driver is estimated by a comparison of the generated pattern of the vehicle driver with the eyes distribution pattern accumulated in the memory 20.

The comparison of the patterns is especially advantageous because the estimation of the concentration degree is tailored to each of the vehicle driver due to the difference of the eyes distribution pattern of each driver. That is, it is possible for appropriately estimating the concentration degree adaptively to the characteristic of the individual vehicle driver by using the eyes distribution pattern respectively different for each of the vehicle driver (cf. FIG. 7A-FIG. 9C).

Furthermore, whether the control situation of the vehicle acquired with the operation situation acquisition unit 30 fulfills a predetermined condition for notification is determined, and fulfillment of the notification condition leads to the provision of the notification through the notification unit 50 according to the concentration degree of the vehicle driver estimated with the estimation unit 44.

Therefore, safety of the calling attention is increased relative to the notification provision based only on the fulfillment of the control situation from the acquisition unit 30. That is, if the notification of the attention calling is provided solely on the predetermined condition of the control situation for the notification, the driver may adversely feel annoyed and may be distracted to deteriorate the safety of driving, just like the deterioration of the safety by the provision of notification for the driver being concentrated for the driving.

The attention calling apparatus 1 of the present invention does not provide the notification if the concentration degree is high even when the control situation fulfills the predetermined condition for the notification based on the determination that, due to the concentration, the driving is safely conducted or the fulfillment of the notification condition is intentional.

Figure 9A:
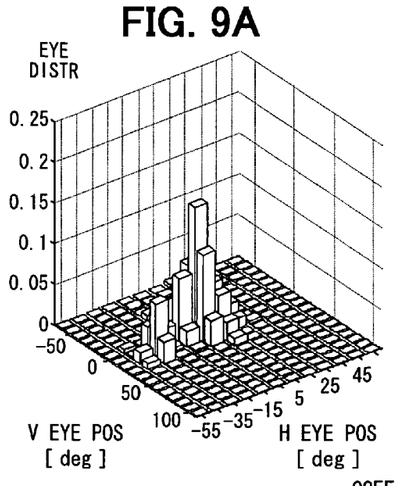
FIGS. 9A to 9C shows illustrations of an eyes distribution pattern and related information when a driver is intentionally approaching to a leading vehicle.
Figure 9B:
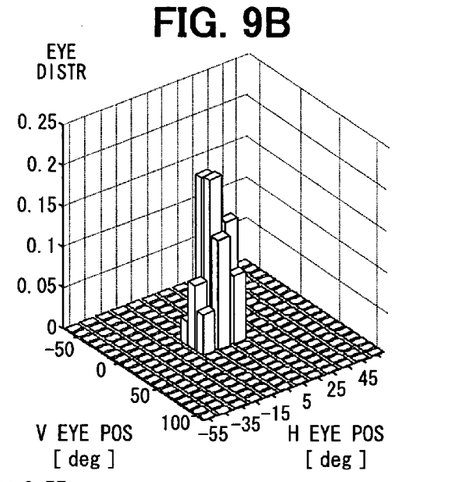
Figure 9C:
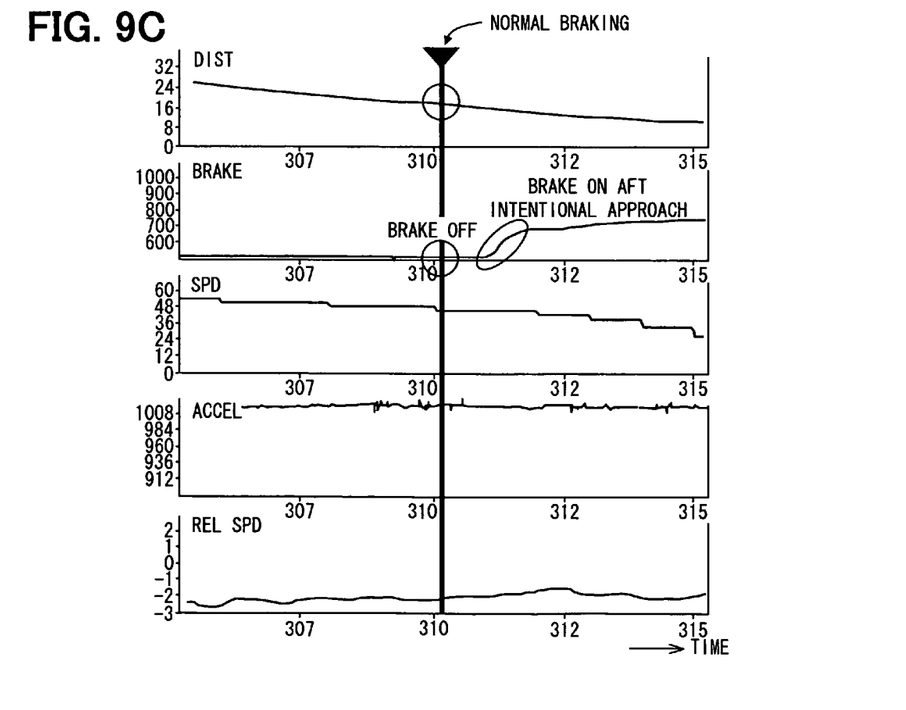

In other words, the notification is not provided for a delayed braking operation timing of brakes 32 when the coefficient of correlation of the eyes distribution patterns shown in FIGS. 9A and 9B has a higher value of 0.77 indicating that the driver is concentrating on the driving even if braking timing is delayed from a normal timing as shown in FIG. 9C. The delay of braking is considered as intentional.

That is, a distraction causing notification is prevented when the driver concentrates on the driving according to the operation scheme of the apparatus 1 in the present embodiment, thereby making the apparatus 1 more effectively contributing the safety of driving.

Second Embodiment

A driving support device 2 is explained based on FIG. 10 in the following. In addition, because the attention calling apparatus 1 of the first embodiment has a similar configuration, like parts have like numbers in the following description and the identical parts in the driving support device 2 that have already appeared in the description of the attention calling apparatus 1 are omitted from the explanation.

Figure 10:
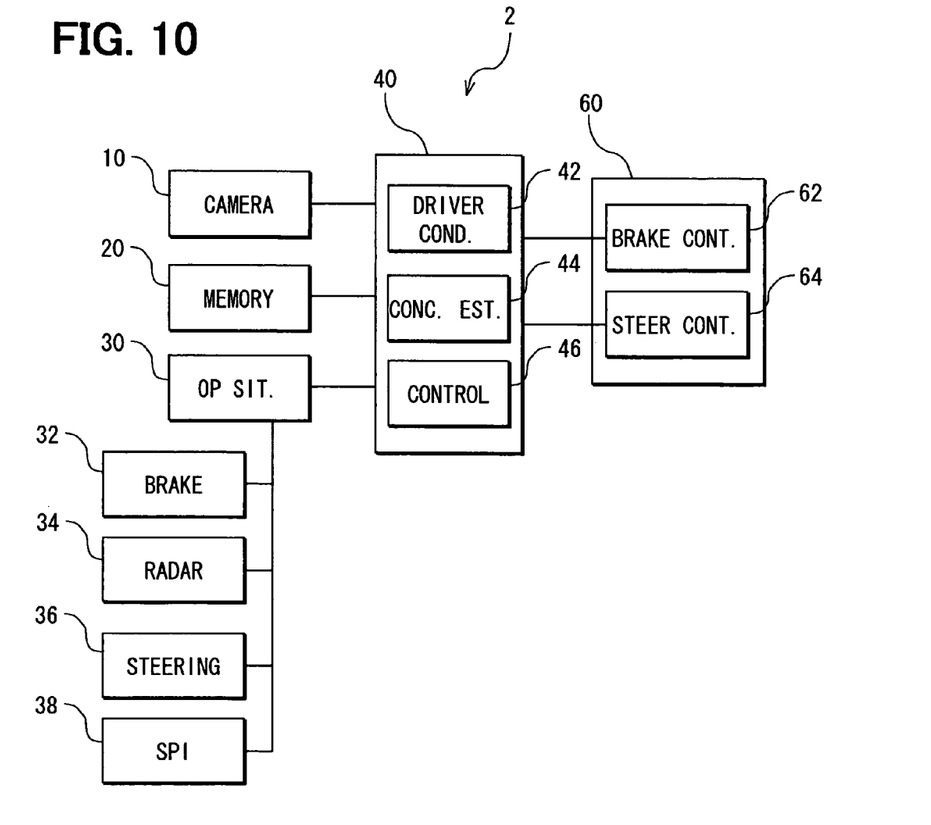
FIG. 10 shows a block diagram of an outline constitution of a driving support apparatus 2.

FIG. 10 is a block diagram showing the configuration of the outline of driving support device 2. In substitution for the notification unit 50 of the attention calling apparatus 1 of the first embodiment, a vehicle control unit 60 is provided. The vehicle control unit 60 has a brake control unit 62 and a steering control unit 64.

The brake control unit 62 operates brakes 32 in response to an instruction from the control unit 40. The steering control unit 62 operates the steering wheel 36 in response to an instruction from the control unit 40.

The operation situation acquisition unit 30 acquires the brakes operation situation by the vehicle driver, the distance to a leading vehicle, the movement of the lateral direction relative to the vehicle travel direction and the speed of the vehicle. More practically, an operation timing of brakes 32 is acquired from brakes 32, and the distance to a leading vehicle is acquired from the radar 34. In addition, the movement of the lateral direction of the vehicle is acquired based on the change of a steering angle of the steering wheel 36, and the speed of the vehicle is acquired from a speedometer 38.

The vehicle driver condition estimation unit 42 is based on the movement of the lateral direction relative to the travel direction of a vehicle acquired by the operation situation acquisition unit 30, and the ratio of the change of the movement of the lateral direction relative to the travel direction of the vehicle is calculated. Then, the degree of the change of the movement of the lateral direction of the vehicle calculated above is used to estimate the state of the mind and body of the vehicle driver who is driving the vehicle.

More practically, when the ratio of the change of the movement of the lateral direction relative to the travel direction of the vehicle is greater than a predetermined ratio of the change of the movement in the lateral direction, an inattentive driving, drowsy driving or rambling driving is estimated.

The concentration estimation unit 44 estimates the concentration degree for the driving of the vehicle driver based on the timing of brake operation of the vehicle driver during the driving. In other words, the vehicle driver is estimated to have a higher degree of concentration for the driving when a comparison between a current brake timing for a current measurement of an inter-vehicle distance and a stored history data of the brake timing after calculation of a measurement of the time to reach the leading vehicle derived from the distance and speed of the leading vehicle yields the current brake timing is within a permissible range.

When the controller 46 calculates the time to reach the leading vehicle based on the speed and distance from the leading vehicle acquired by the acquisition unit 30 and finds out that a timing of the brake operation is smaller than the time to reach the leading vehicle, the vehicle is controlled according to the concentration degree of the drive for the driving through the controller 60.

In other words, the time-of-arrival to the leading vehicle is calculated at a time when the vehicle driver has performed a brake operation, and if the time to reach the leading vehicle is smaller, the brakes is operated by outputting a brake operation instruction from the vehicle control unit 60.

When the concentration degree of the vehicle driver is high, a brake operation instruction is not output assuming that the vehicle driver is intentionally decreasing the distance from the leading vehicle without operating brakes 32.

(Driving Support Processing)

Driving support processing carried out with the control unit 40 is explained in the following. Because the driving support processing is similar to the attention calling processing in the first embodiment, the description in the following is focused on a difference from the attention calling processing.

In the driving support processing, vehicle control processing is performed in substitution for notification processing. In other words, in S100-S110 as shown in FIG. 2, the vehicle driver condition estimation processing, the concentration degree estimation processing, and the information storage processing are performed in the same manner as the attention calling processing, and vehicle control processing is performed in substitution the notification processing in S115.

(Driver Condition Estimation Processing)

Figure 11:
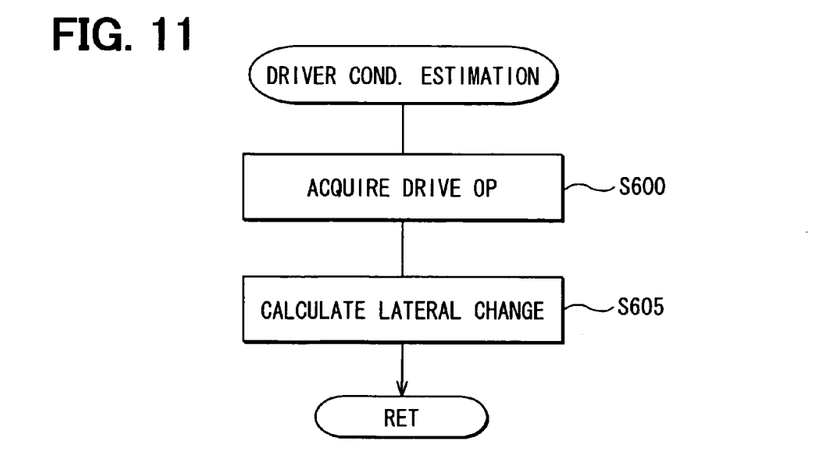
FIG. 11 shows a flow chart of driver condition estimation processing.

Driver condition estimation processing is explained based on FIG. 11 next. FIG. 11 is a flow chart of the vehicle driver condition estimation processing that is a subroutine of the attention calling processing.

In the vehicle driver condition estimation processing, a steering angle of the steering wheel 36, an operation condition of brakes 32, the distance to leading vehicle from the radar 34 and a value (i.e., a vehicle speed) of the speedometer 38 are acquired from the operation situation acquisition unit 30 in S600 for a predetermined time as shown in FIG. 11.

Subsequently in S605, a change ratio of the movement of the lateral direction of the vehicle is calculated from a steering angle of the steering wheel 36 for the predetermined time acquired in S600, and processing is finished.

(Concentration Degree Estimation Processing)

Figure 12:
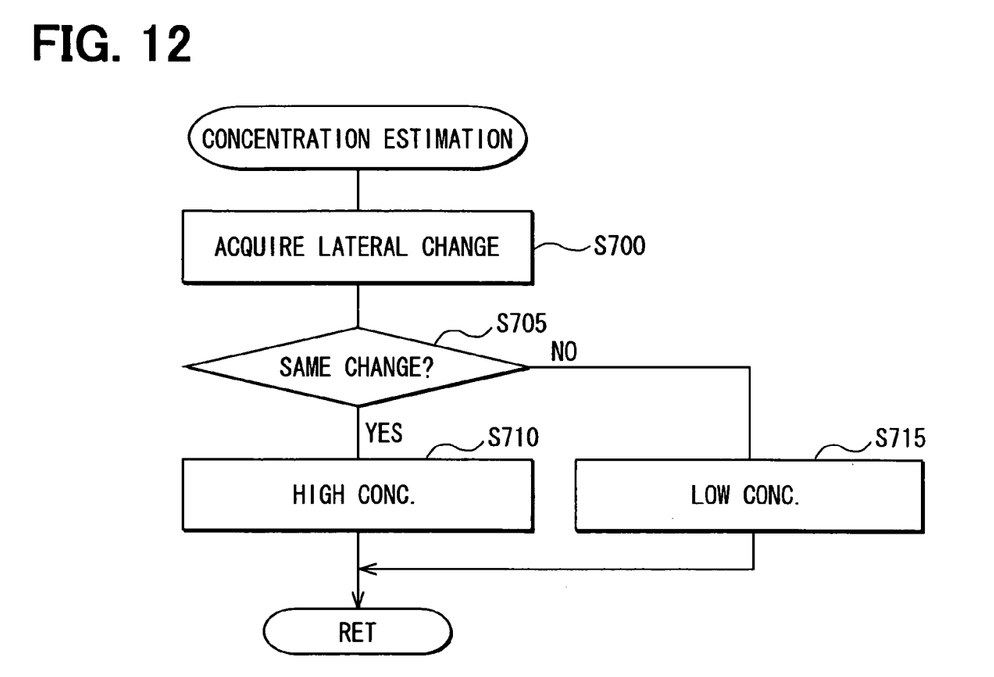
FIG. 12 shows a flow chart of concentration degree estimation processing.

Concentration degree estimation processing is explained with reference to FIG. 12 next. FIG. 12 is a flow chart of a subroutine of the attention calling processing.

In the concentration degree estimation processing, the change ratio of the lateral direction of the vehicle at the time of concentrated driving accumulated to the memory 20 is acquired in S700 as shown in FIG. 12. Subsequently in S705, the change ratio of the lateral direction of the vehicle at the time of concentrated driving acquired in S600 is compared with the change ratio of the lateral direction of the vehicle calculated in S605 (cf. FIG. 11). If both change rates agree with each other (S705:Yes), the processing is finished assuming that the concentration degree for the driving of the current vehicle driver is "high." If the change rates does not agree (S705:No), the concentration degree for the driving of the current vehicle driver is assumed to be "low," and the processing is finished.

(Information Storage Processing)

In the information storage processing in the second embodiment, the processing is the same as the information storage processing in the first embodiment except that the change ratio of the lateral direction of the vehicle is accumulated to the memory 20 in substitution for the eyes distribution pattern in S410 of the information storage handling of first embodiment shown in the FIG. 5.

(Vehicle Control Processing)

In the second embodiment, vehicle control processing is performed in substitution for the attention calling processing of the first embodiment that is shown in FIG. 6. While processing is just finished when it was determined that the concentration degree of the vehicle driver is "high" in S505 (S505:Yes) of the FIG. 6 in the vehicle control processing, the notification for attention calling for the vehicle driver through the notification unit 50 is replaced with a transmission of an instruction signal to the vehicle control unit 60 for operating brakes 32 by the brake control unit 62 before finishing the processing, when the concentration degree is not determined "high" (that is, when the concentration degree is "low").

(Characteristic of Driving Support Device 2)

The driving support device 2 estimates, based on the ratio of the change of the movement in the lateral direction relative to the travel direction of the vehicle, the state of the mind and body of the vehicle driver driving a vehicle, and also estimates the concentration degree of the vehicle driver based on a timing of the brake operation by the vehicle driver.

The state of the mind and body of the vehicle driver and the concentration degree for the driving are estimated based on information provided from the vehicle in the above-described manner. In other words, device configuration can be made simpler because no dedicated device to directly acquire the state of the mind and body of the vehicle driver is required.

In addition, the time to reach the leading vehicle is calculated at a time when the vehicle driver performs brake operation, and a brake operation instruction signal is output to the vehicle control unit 60 to operate brakes 32 when the time to reach the leading vehicle is smaller than the timing of the brake operation at the time of the brake operation. If the concentration degree of the vehicle driver is high at the above time, the brake operation instruction signal is not output assuming that the driver does not operate brakes 32 so that he/she intentionally decreases the distance to the leading vehicle.

In other words, if the vehicle driver concentrates on the driving even if operation timings of brakes 32 are later than usual, the vehicle driver's intention of not operating brakes 32 is respected, and brakes 32 is not operated the vehicle control unit 60. Therefore, the vehicle driver does not feel annoyed by an unintentional brake operation.

On the other hand, driving safety is secured by slowing down or stopping of the vehicle because brakes 32 are operated by the brake control unit 62 if the vehicle driver is detected to be not concentrated on the driving. That is, when the vehicle driver drives the vehicle in a rambling manner or the like, driving safety of the vehicle is secured.

Third Embodiment

The attention calling apparatus which estimates the state of the mind and body of the vehicle driver based on the operation situation of brakes 32 by the vehicle driver is described in the third embodiment next. The attention calling apparatus is used to warn the vehicle driver. Because the configuration of the attention calling apparatus of the third embodiment is the same as the configuration of the attention calling apparatus 1 of the first embodiment, and the processing in the device is similar, only the difference of the processing is explained.

In the attention calling apparatus of the third embodiment, an operation pattern of brakes 32 is extracted in substitution for the eyes distribution pattern in the vehicle driver condition estimation processing. In other words, in FIG. 3, the operation pattern of brakes 32 is extracted in S210 based on the operation of brakes 32 acquired in S200, a timing of the brake operation and the distance to the leading vehicle.

Then, in the concentration degree estimation processing, the concentration degree is estimated in substitution for the eyes distribution pattern by an operation pattern of brakes 32. In other words, in FIG. 4, the operation pattern of brakes 32 is acquired in S300, and it is determined in S305 whether the operation pattern of brakes 32 is same.

In addition, in the information storage processing, the operation pattern of brakes 32 is stored in substitution for the eyes distribution pattern. In other words, in FIG. 5, the operation pattern of brakes 32 is accumulated to the memory 20 in S410.

Furthermore, in the attention calling processing, it is determined whether the concentration degree is "high" based on the operation pattern of brakes 32 in substitution for the eyes distribution pattern. In other words, in S505 of the FIG. 6, it is determined, based on the operation pattern of brakes 32, whether the concentration degree is "high."

Figure 7C:
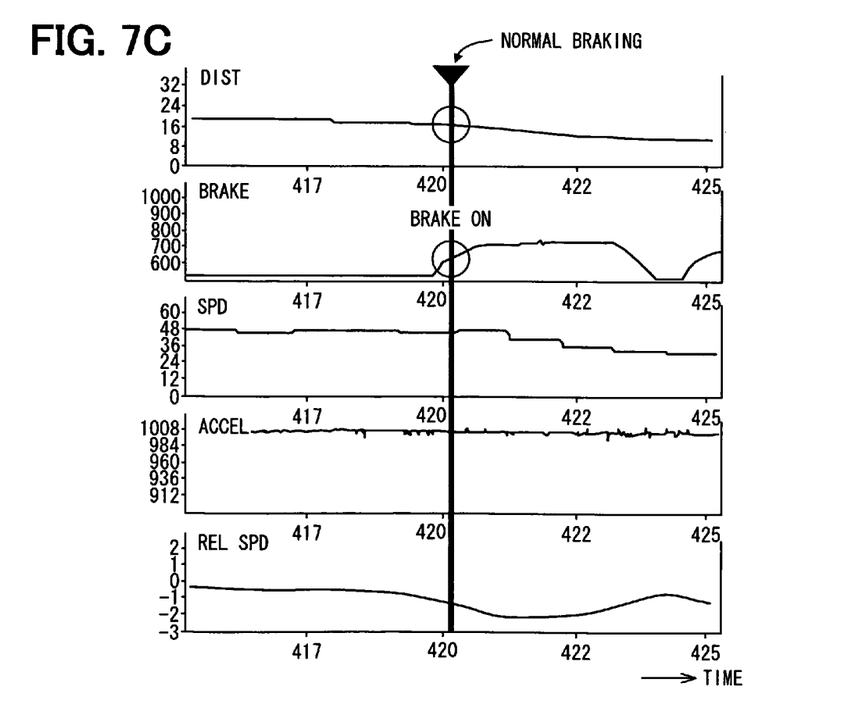
Figure 8C:
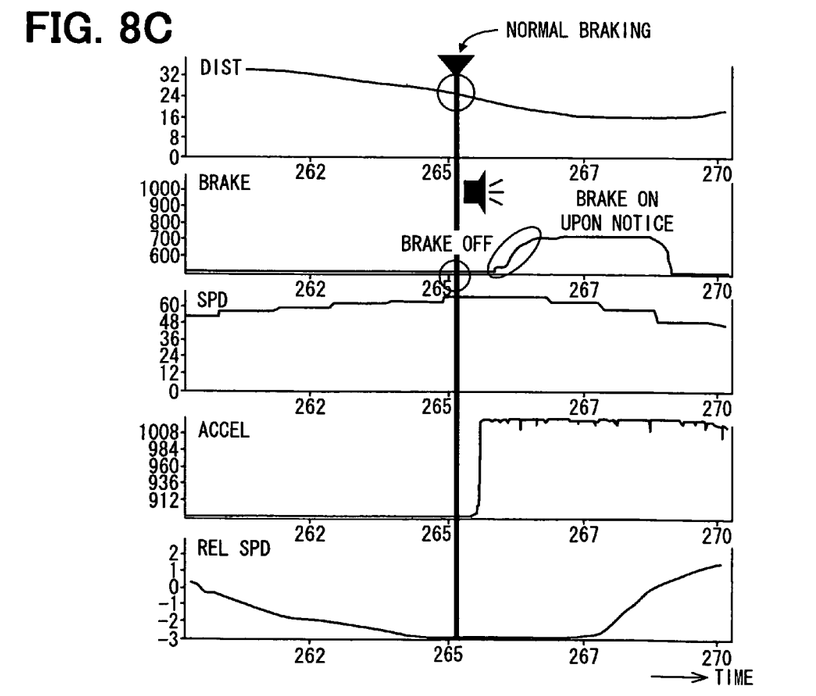

When the concentration degree is determined to be high in the above processing, the notification of attention calling is not provided because brakes 32 are operated at a usual braking timing as shown in FIG. 7C. In addition, when the concentration degree is low, the notification of attention calling is provided because brakes 32 are not operated at the usual braking timing as shown in FIG. 8C.

Although the present invention has been fully described in connection with the preferred embodiment thereof with reference to the accompanying drawings, it is to be noted that various changes and modifications will become apparent to those skilled in the art.

In the second embodiment, vehicle speed is decreased by operating brakes 32, or the vehicle is stopped by the braking. However, for example, a travel direction of the vehicle may be changed by the steering wheel 36 through the steering control unit 64 for avoiding unsafe situation of the vehicle.

Such changes and modifications are to be understood as being within the scope of the present invention as defined by the appended claims.

What is claimed is:

1. A database apparatus comprising:
   a condition estimation unit capable of estimating a driver condition of a driver who is driving a vehicle;
   an operation acquisition unit capable of acquiring an operation sequence of the vehicle by the driver;
   a storage unit capable of storing the driver condition estimated by the condition estimation unit and the operation sequence acquired by the operation acquisition unit;
   a concentration estimation unit capable of estimating a degree of concentration of the driver on driving operation by comparing the driver condition estimated by the condition estimation unit or the operation sequence acquired by the operation acquisition unit with the driver condition or the operation sequence stored in the storage unit; and
   a control unit capable of performing a control for sequentially storing, to the storage unit for accumulation, the driver condition in association with the operation sequence when the degree of concentration estimated by the concentration estimation unit is determined, by the control unit, to have a value that is higher than a threshold.

2. The database apparatus of claim 1, wherein
the condition estimation unit is configured to be capable of acquiring a trace of a look direction of the driver, and
the driver condition is estimated based on the trace of the look direction of the driver.

3. The database apparatus of claim 2, wherein
the condition estimation unit generates a look distribution pattern based on the trace of the look direction of the driver who drives the vehicle during a predetermined period for estimating the driver condition, and
the concentration estimation unit compares the look distribution pattern with the look distribution pattern stored in the storage unit for estimating the degree of concentration of the driver on driving operation.

4. The database apparatus of claim 1, wherein
the operation acquisition unit is configured to be capable of lateral movement of the vehicle based on a travel direction of the vehicle, and
the condition estimation unit estimates the driver condition based on a change rate of the lateral movement that is calculated as a ratio of the lateral movement against the movement in the travel direction of the vehicle.

5. The database apparatus of claim 1, wherein
the operation acquisition unit acquires a brake operation as the operation sequence of the driver, and
the concentration estimation unit estimates the degree of concentration of the driver on driving operation based on a brake operation timing.

6. An attention calling apparatus comprising:
the database apparatus of claim 1;
a notification unit capable of providing an attention call for the driver of the vehicle; and
an attention control unit capable of controlling the notification unit to provide the attention call, wherein the attention control unit determines whether a predetermined condition of operation sequence of the vehicle for providing the attention call is fulfilled based on the operation sequence acquired by the operation acquisition unit, and controls the notification unit to provide the attention call for the driver according to the degree of concentration of the driver on driving operation if the predetermined condition of the operation sequence is fulfilled.

7. A driving support apparatus comprising:
the database apparatus of claim 1;
a vehicle controller capable of controlling the vehicle upon receiving an instruction; and
a driving control unit capable of controlling the notification unit to provide the attention call, wherein the attention control unit determines whether the operation sequence of the vehicle fulfills a predetermined condition for controlling the vehicle is fulfilled based on the operation sequence acquired by the operation acquisition unit, and controls the notification unit to provide the attention call for the driver according to the degree of concentration of the driver on driving operation if the predetermined condition of the operation sequence is fulfilled.

8. The driving support apparatus of claim 7, wherein
the operation acquisition unit is configured to be capable of acquiring a distance between the vehicle and a front object that exists in front of the vehicle as well as acquiring a speed of the vehicle,
the predetermined condition for controlling the vehicle is defined as a time to reach the front object, and
the driving control unit calculates the time to reach the front object based on the distance to the front object and the speed of the vehicle acquired by the operation acquisition unit, and outputs an instruction for controlling the vehicle according to the degree of concentration of the driver on driving operation if the calculated time to reach the front object is smaller than a threshold.

9. An attention calling apparatus comprising:
the database apparatus of claim 2;
a notification unit capable of providing an attention call for the driver of the vehicle; and
an attention control unit capable of controlling the notification unit to provide the attention call, wherein the attention control unit determines whether a predetermined condition of operation sequence of the vehicle for providing the attention call is fulfilled based on the operation sequence acquired by the operation acquisition unit, and controls the notification unit to provide the attention call for the driver according to the degree of concentration of the driver on driving operation if the predetermined condition of the operation sequence is fulfilled.

10. An attention calling apparatus comprising:
the database apparatus of claim 3;
a notification unit capable of providing an attention call for the driver of the vehicle; and
an attention control unit capable of controlling the notification unit to provide the attention call, wherein the attention control unit determines whether a predetermined condition of operation sequence of the vehicle for providing the attention call is fulfilled based on the operation sequence acquired by the operation acquisition unit, and controls the notification unit to provide the attention call for the driver according to the degree of concentration of the driver on driving operation if the predetermined condition of the operation sequence is fulfilled.

11. An attention calling apparatus comprising:
the database apparatus of claim 4;
a notification unit capable of providing an attention call for the driver of the vehicle; and
an attention control unit capable of controlling the notification unit to provide the attention call, wherein the attention control unit determines whether a predetermined condition of operation sequence of the vehicle for providing the attention call is fulfilled based on the operation sequence acquired by the operation acquisition unit, and controls the notification unit to provide the attention call for the driver according to the degree of concentration of the driver on driving operation if the predetermined condition of the operation sequence is fulfilled.

12. An attention calling apparatus comprising:
the database apparatus of claim 5;
a notification unit capable of providing an attention call for the driver of the vehicle; and
an attention control unit capable of controlling the notification unit to provide the attention call, wherein the attention control unit determines whether a predetermined condition of operation sequence of the vehicle for providing the attention call is fulfilled based on the operation sequence acquired by the operation acquisition unit, and controls the notification unit to provide the attention call for the driver according to the degree of concentration of the driver on driving operation if the predetermined condition of the operation sequence is fulfilled.

13. A driving support apparatus comprising:

the database apparatus of claim 2;

a vehicle controller capable of controlling the vehicle upon receiving an instruction; and a driving control unit capable of controlling the notification unit to provide the attention call, wherein the attention control unit determines whether the operation sequence of the vehicle fulfills a predetermined condition for controlling the vehicle is fulfilled based on the operation sequence acquired by the operation acquisition unit, and controls the notification unit to provide the attention call for the driver according to the degree of concentration of the driver on driving operation if the predetermined condition of the operation sequence is fulfilled.

14. The driving support apparatus of claim 13, wherein the operation acquisition unit is configured to be capable of acquiring a distance between the vehicle and a front object that exists in front of the vehicle as well as acquiring a speed of the vehicle, the predetermined condition for controlling the vehicle is defined as a time to reach the front object, and the driving control unit calculates the time to reach the front object based on the distance to the front object and the speed of the vehicle acquired by the operation acquisition unit, and outputs an instruction for controlling the vehicle according to the degree of concentration of the driver on driving operation if the calculated time to reach the front object is smaller than a threshold.

15. A driving support apparatus comprising:

the database apparatus of claim 3;

a vehicle controller capable of controlling the vehicle upon receiving an instruction; and a driving control unit capable of controlling the notification unit to provide the attention call, wherein the attention control unit determines whether the operation sequence of the vehicle fulfills a predetermined condition for controlling the vehicle is fulfilled based on the operation sequence acquired by the operation acquisition unit, and controls the notification unit to provide the attention call for the driver according to the degree of concentration of the driver on driving operation if the predetermined condition of the operation sequence is fulfilled.

16. The driving support apparatus of claim 15, wherein the operation acquisition unit is configured to be capable of acquiring a distance between the vehicle and a front object that exists in front of the vehicle as well as acquiring a speed of the vehicle, the predetermined condition for controlling the vehicle is defined as a time to reach the front object, and the driving control unit calculates the time to reach the front object based on the distance to the front object and the speed of the vehicle acquired by the operation acquisition unit, and outputs an instruction for controlling the vehicle according to the degree of concentration of the driver on driving operation if the calculated time to reach the front object is smaller than a threshold.

17. A driving support apparatus comprising:

the database apparatus of claim 4;

a vehicle controller capable of controlling the vehicle upon receiving an instruction; and a driving control unit capable of controlling the notification unit to provide the attention call, wherein the attention control unit determines whether the operation sequence of the vehicle fulfills a predetermined condition for controlling the vehicle is fulfilled based on the operation sequence acquired by the operation acquisition unit, and controls the notification unit to provide the attention call for the driver according to the degree of concentration of the driver on driving operation if the predetermined condition of the operation sequence is fulfilled.

18. The driving support apparatus of claim 17, wherein the operation acquisition unit is configured to be capable of acquiring a distance between the vehicle and a front object that exists in front of the vehicle as well as acquiring a speed of the vehicle, the predetermined condition for controlling the vehicle is defined as a time to reach the front object, and the driving control unit calculates the time to reach the front object based on the distance to the front object and the speed of the vehicle acquired by the operation acquisition unit, and outputs an instruction for controlling the vehicle according to the degree of concentration of the driver on driving operation if the calculated time to reach the front object is smaller than a threshold.

19. A driving support apparatus comprising:

the database apparatus of claim 5;

a vehicle controller capable of controlling the vehicle upon receiving an instruction; and a driving control unit capable of controlling the notification unit to provide the attention call, wherein the attention control unit determines whether the operation sequence of the vehicle fulfills a predetermined condition for controlling the vehicle is fulfilled based on the operation sequence acquired by the operation acquisition unit, and controls the notification unit to provide the attention call for the driver according to the degree of concentration of the driver on driving operation if the predetermined condition of the operation sequence is fulfilled.

20. The driving support apparatus of claim 19, wherein the operation acquisition unit is configured to be capable of acquiring a distance between the vehicle and a front object that exists in front of the vehicle as well as acquiring a speed of the vehicle, the predetermined condition for controlling the vehicle is defined as a time to reach the front object, and the driving control unit calculates the time to reach the front object based on the distance to the front object and the speed of the vehicle acquired by the operation acquisition unit, and outputs an instruction for controlling the vehicle according to the degree of concentration of the driver on driving operation if the calculated time to reach the front object is smaller than a threshold.

\* \* \* \* \*